United States Patent
Koo et al.

(10) Patent No.: US 9,859,576 B2
(45) Date of Patent: Jan. 2, 2018

(54) MEMBRANE HUMIDIFIER FOR FUEL CELL

(71) Applicant: HYUNDAI MOTOR COMPANY, Seoul (KR)

(72) Inventors: Jin Woo Koo, Seoul (KR); Hyun Yoo Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 89 days.

(21) Appl. No.: 14/956,262

(22) Filed: Dec. 1, 2015

(65) Prior Publication Data
US 2016/0322654 A1 Nov. 3, 2016

(30) Foreign Application Priority Data
Apr. 30, 2015 (KR) .................. 10-2015-0061047

(51) Int. Cl.
*H01M 8/04* (2016.01)
*H01M 8/04119* (2016.01)
*B01D 63/02* (2006.01)

(52) U.S. Cl.
CPC ......... *H01M 8/04149* (2013.01); *B01D 63/02* (2013.01); *B01D 63/022* (2013.01); *H01M 2250/20* (2013.01); *Y02T 90/32* (2013.01)

(58) Field of Classification Search
CPC . B01D 63/022; B01D 63/02; H01M 8/04149; H01M 2250/20; Y02T 90/32
See application file for complete search history.

(56) References Cited

U.S. PATENT DOCUMENTS

| | | | | |
|---|---|---|---|---|
| 4,066,553 A | * | 1/1978 | Bardonnet | B01D 63/065 210/321.87 |
| 4,293,418 A | * | 10/1981 | Fujii | B01D 53/22 210/321.81 |
| 4,950,391 A | * | 8/1990 | Weickhardt | B01D 63/02 210/321.8 |
| 4,961,760 A | * | 10/1990 | Caskey | B01D 53/22 210/321.81 |
| 5,198,110 A | * | 3/1993 | Hanai | B01D 53/22 210/321.78 |
| 5,725,949 A | * | 3/1998 | Pasquali | B01D 63/02 428/222 |
| 5,779,897 A | * | 7/1998 | Kalthod | B01D 53/22 210/321.8 |
| 6,136,073 A | * | 10/2000 | Coan | B01D 53/22 210/321.8 |

(Continued)

FOREIGN PATENT DOCUMENTS

CN 101628203 A * 1/2010
DE WO 2004035181 A1 * 4/2004 ............ B01D 53/22

(Continued)

*Primary Examiner* — Amber R Orlando
*Assistant Examiner* — Stephen Hobson
(74) *Attorney, Agent, or Firm* — McDermott Will & Emery LLP (57) ABSTRACT

A membrane humidifier includes buffering and spacing structures each interposed between adjacent hollow fiber membranes of a plurality of hollow fiber membranes arranged in a housing of the membrane humidifier, wherein the buffering and spacing structures buffer a pressure of air supplied from an air blower and maintain a spacing between the adjacent hollow fiber membranes.

7 Claims, 4 Drawing Sheets

(56) References Cited

U.S. PATENT DOCUMENTS

| | | | | |
|---|---|---|---|---|
| 6,805,730 B2* | 10/2004 | Herczeg | ............... | B01D 63/02 210/321.8 |
| 8,021,619 B2* | 9/2011 | Nickel | ............... | B01D 61/362 210/321.8 |
| 8,661,830 B2* | 3/2014 | Ku | ............... | B01D 53/22 60/39.12 |
| 8,840,711 B2* | 9/2014 | Schirrmeister | ....... | B01D 53/22 427/309 |
| 9,034,083 B2* | 5/2015 | Galea | ............... | B01D 63/02 156/296 |
| 9,248,412 B2* | 2/2016 | Jerman | ............... | B01D 63/022 |
| 9,340,297 B2* | 5/2016 | Cao | ............... | B01D 53/22 |
| 9,533,261 B2* | 1/2017 | Teo | ............... | B01D 63/022 |
| 9,610,550 B2* | 4/2017 | Alvarez, Jr. | ....... | C23C 16/4481 |
| 9,640,814 B2* | 5/2017 | Kim | ............... | H01M 8/04291 |
| 2001/0015500 A1* | 8/2001 | Shimanuki | ......... | B01F 3/04007 261/104 |
| 2004/0178136 A1* | 9/2004 | Taniguchi | ............. | B01D 63/02 210/321.79 |
| 2006/0124531 A1* | 6/2006 | Behrendt | ............. | B01D 63/02 210/321.88 |
| 2007/0158257 A1* | 7/2007 | Schafer | ................ | B01D 63/02 210/321.88 |
| 2010/0155334 A1* | 6/2010 | Taniguchi | ............. | B01D 63/02 210/650 |
| 2010/0170850 A1* | 7/2010 | Heilmann | ............. | B01D 61/28 210/646 |
| 2012/0043271 A1* | 2/2012 | Maurer | ............... | B01D 63/02 210/321.9 |
| 2012/0111967 A1* | 5/2012 | Katagiri | ............... | B01D 63/02 239/34 |
| 2013/0065140 A1* | 3/2013 | Kim | ............... | B01D 63/04 429/413 |
| 2013/0149634 A1* | 6/2013 | Kim | ............... | B01D 63/021 429/516 |
| 2013/0306545 A1* | 11/2013 | Shinohara | ........... | B01D 63/022 210/321.89 |
| 2014/0134507 A1* | 5/2014 | Fasold | ............... | H01M 8/04149 429/413 |
| 2014/0319045 A1* | 10/2014 | Shevitz | ............... | B01D 63/021 210/321.89 |

FOREIGN PATENT DOCUMENTS

| | | |
|---|---|---|
| JP | 2002-289229 A | 10/2002 |
| JP | 2004-311287 A | 11/2004 |
| KR | 10-2011-0060048 A | 6/2011 |
| KR | 10-2013-0029306 A | 3/2013 |
| KR | 10-2014-0010774 A | 1/2014 |
| KR | 10-2014-0025710 A | 3/2014 |
| KR | 10-2013-0065033 A | 6/2014 |

* cited by examiner

- Related art -

- Present invention -

MEMBRANE HUMIDIFIER FOR FUEL CELL

CROSS-REFERENCE TO RELATED APPLICATION

This application claims, under 35 U.S.C. §119(a), the benefit of priority to Korean Patent Application No. 10-2015-0061047 filed on Apr. 30, 2015 with the Korean Intellectual Property Office, the entire contents of which are incorporated herein by reference.

TECHNICAL FIELD

The present disclosure relates to a membrane humidifier for a fuel cell. More particularly, it relates to a membrane humidifier for a fuel cell in which structures for buffering and spacing of a plurality of hollow fiber membranes are each interposed between adjacent ones of the hollow fiber membranes, to space the adjacent hollow fiber membranes.

BACKGROUND

Generally, humidification of an electrolytic membrane in a fuel cell is important for the operation of the fuel cell. To this end, a humidification device is used. Such a humidification device operates such that dry gas supplied from the atmosphere to a fuel cell exchanges moisture with humid gas exhausted from the fuel cell.

A variety of humidification device types exist, for example, an ultrasonic humidification device, a steam humidification device, a vaporization humidification device, etc. However, a membrane humidifier using hollow fiber membranes has been used as an appropriate humidification device usable for fuel cells.

To this end, the present applicant proposed a fuel cell membrane module manufacturing method as disclosed in a patent application issued as a Korean Patent Registration No. 10-1382672 (Apr. 1, 2014). In this method, a membrane module for use in a membrane humidifier of a fuel cell is manufactured through implementation of a new hollow fiber membrane module structure in which a small number of hollow fiber membranes is arranged at a central portion of the module, and a gradually increased number of hollow fiber membranes is arranged toward a peripheral portion of the module. As such, uniform humidification performance is obtained throughout the entirerty of hollow fiber membranes in that dry air introduced from an air blower can be distributed toward the peripheral portion of the module where an increased number of hollow fiber membranes is arranged.

However, the above-mentioned registered patent has the following drawbacks.

First, in a variable pressure system in which the pressure of air introduced into a humidifier is high, there may be a leaning phenomenon in which hollow fiber membranes arranged in a membrane humidifier are inclined toward one side or a risk of breakage of hollow fiber membranes may exist. In this case, humidification efficiency may be severely lowered.

Second, in a potting process for dispersed arrangement of hollow fiber membranes, the hollow fiber membranes may be twisted.

Third, although a space for maintenance of the spacing between the adjacent hollow fiber membranes may be secured through a dispersed arrangement of the hollow fiber membranes, there is a drawback of an increase in unnecessary space.

SUMMARY OF THE DISCLOSURE

The present disclosure has been made in an effort to solve the above-described problems associated with prior art.

The present disclosure relates to a membrane humidifier for a fuel cell in which separate structures for buffering and spacing of a plurality of hollow fiber membranes in a membrane humidifier are each interposed between adjacent ones of the hollow fiber membranes, not only to buffer the hollow fiber membranes, which are exposed to high-pressure air, but also to maintain desired spacing between the adjacent hollow fiber membranes and, as such, humid air is smoothly supplied between the adjacent hollow fiber membranes, and dry air is uniformly distributed in the hollow fiber membranes, thereby achieving an enhancement in humidification performance.

In one aspect, the present disclosure provides a membrane humidifier including buffering and spacing structures each interposed between adjacent ones of a plurality of hollow fiber membranes arranged in a housing of the membrane humidifier, not only to buffer a pressure of air supplied from an air blower, but also to maintain a spacing between the adjacent hollow fiber membranes.

In a preferred embodiment, the buffering and spacing structures may be arranged such that a largest number of buffering and spacing structures is arranged at a central side, and a gradually reduced number of buffering and spacing structures is arranged toward a peripheral side.

In another preferred embodiment, the buffering and spacing structures may be made of a hydrophilic material.

In still another preferred embodiment, the buffering and spacing structures may have a greater diameter than the hollow fiber membranes and a length equal to a length of the hollow fiber membranes.

In yet another preferred embodiment, the buffering and spacing structrues may have a shape selected from a straight shape, a zig-zag shape, a protrusion/groove shape, a coil spring shape, a crimp shape, and a mesh roll shape.

In still yet another preferred embodiment, opposite ends of the buffering and spacing structures may be potted together with opposite ends of the hollow fiber membranes, using a potting material.

In a further preferred embodiment, humid air guide holes or grooves may be formed at each of the buffering and spacing structures in a radial direction of the buffering and spacing structure.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

For better understanding the present disclosure, a configuration and operation of a membrane humidifier for a fuel cell will be described.

Figure 1:
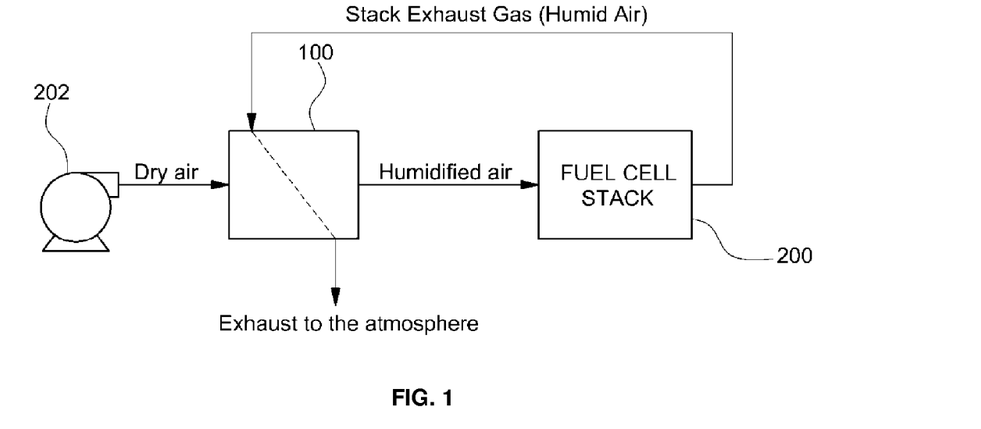
FIG. 1 is a diagram illustrating a configuration of an air supply system in a fuel cell system.
Figure 2:
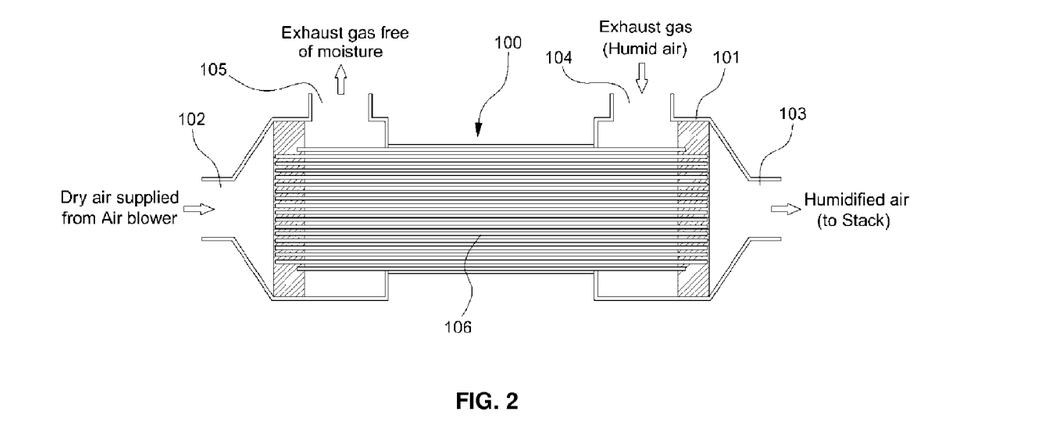
FIG. 2 is a sectional view briefly illustrating a configuration of a conventional membrane humidifier for a fuel cell.

FIG. 1 illustrates an air supply system of a fuel cell system. FIG. 2 illustrates a configuration of a conventional membrane humidifier included in the air supply system.

The fuel cell system may include a fuel supply system for supplying fuel (hydrogen) to a fuel cell stack, an air supply system for supplying, to the fuel cell stack, oxygen contained in air as an oxidant required for electrochemical reaction, a heat and water management system for controlling an operation temperature of the fuel cell stack, and a fuel cell stack for generating electric energy, substantially using hydrogen and air.

Accordingly, as hydrogen is supplied from the fuel supply system to an anode of the fuel cell stack and oxygen is supplied from the air supply system to a cathode of the fuel cell stack, oxidation of hydrogen occurs at the anode and, as such, hydrogen ions (protons) and electrons are generated. The generated protons and electrons move to the cathode through an electrolytic membrane and a separation plate. At the cathode, an electrochemical reaction is generated by the protons and electrons that moved from the anode and the supplied oxygen and, as such, water is produced and electric energy is generated by flow of electrons.

As illustrated in FIG. 1, the air supply system may include a membrane humidifier 100 and an air blower 202 in order to supply humidified air (oxygen) to the fuel cell stack 200.

Accordingly, ambient dry air is supplied to a hollow fiber membrane of the membrane humidifier 100 in accordance with a suction operation of the air blower 202. At the same time, exhaust gas (humid air) discharged from the fuel cell stack 200 after reaction passes through the membrane humidifier 100 and, as such, moisture contained in the exhaust gas penetrates the hollow fiber membrane, thereby humidifying the dry air.

Referring to FIG. 2, the conventional membrane humidifier 100 includes a housing 101 formed, at one end thereof, with a supply port 102, into which dry air from the air blower 202 is introduced, while being formed, at the other end thereof, with a discharge port 103, from which humidified air is discharged. A hollow fiber membrane bundle including a plurality of dense hollow fiber membranes 106 is received in the housing 101 in accordance with a typical potting process.

An inlet 104 is formed at one side of a peripheral portion of the housing 101, for introduction of humid air discharged from the fuel cell stack. An outlet 105 is also formed at an opposite side of the peripheral portion of the housing 101, for discharge of air produced in accordance with removal of moisture from the introduced humid air.

Accordingly, when exhaust gas discharged from the fuel cell stack after reaction, namely, humid air, is supplied from the inlet 104 of the housing 101 to the hollow fiber membranes 106, moisture of the humid air is separated from the humid air in accordance with capillary action of each hollow fiber membranes 106. The separated moisture is condensed while permeating capillary tubes of the hollow fiber membranes 106 and, as such, moves through the insides of the hollow fiber membranes 106.

Subsequently, air produced in accordance with separation of moisture from humid air is directly discharged through the outlet 105 of the housing 101 after moving along the outsides of the hollow fiber membranes 106.

At the same time, ambient air (dry air) is supplied through the supply port 102 of the housing 101 in accordance with the driving of the air blower 202. The dry air supplied through the supply port 102 moves through the inside of the hollow fiber membranes 106. At this time, moisture separated from the humid air has already been moved to the inside of the hollow fiber membranes 106 and, as such, the dry air is humidified by the moisture. The humidified air is supplied to the cathode of the fuel cell stack through the discharge port 103.

However, the hollow fiber membrane bundle has a dense structure of the plurality of hollow fiber membranes 106 and, as such, it may be difficult for humid air introduced through the inlet 104 to penetrate into the inside of the hollow fiber membrane bundle. Furthermore, since the diffusion rate of humid air diffusing through the hollow fiber membranes 106 is very low, the humid air has much difficulty penetrating into the inside of the hollow fiber membranes 106.

In particular, in the interior of the housing 101, humid air passing through the outside of the bundle of the hollow fiber membranes 106 mainly flows along the hollow fiber membranes 106 arranged at a peripheral portion of the hollow fiber membrane bundle without smoothly penetrating into the central portion of the hollow fiber membrane bundle. As a result, dry air humidification efficiency is lowered.

Hereinafter, a configuration of a membrane humidifier for a fuel cell according to the present disclosure will be described.

Figure 3:
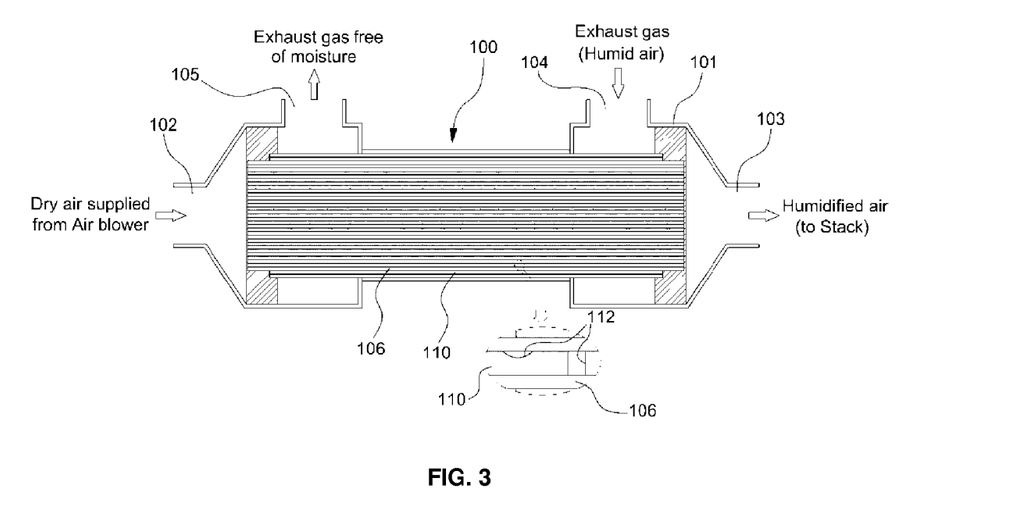
FIG. 3 is a cross-sectional view illustrating a membrane humidifier according to an embodiment of the present disclosure.
Figure 4:
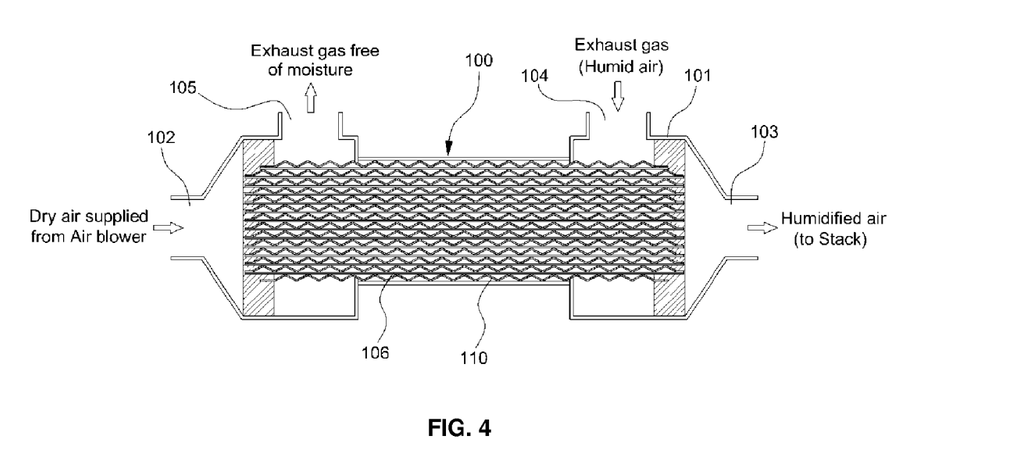
FIG. 4 is a cross-sectional view illustrating a membrane humidifier for a fuel cell according to another embodiment of the present disclosure.

FIG. 3 is a cross-sectional view illustrating a membrane humidifier for a fuel cell according to an embodiment of the present disclosure. FIG. 4 is a cross-sectional view illustrating a membrane humidifier for a fuel cell according to another embodiment of the present disclosure.

As illustrated in FIGS. 3 and 4, the membrane humidifier 100 may include a housing 101 formed, at one end thereof, with a supply port 102, into which dry air from an air blower is introduced, while being formed, at the other end thereof, with a discharge port 103, from which humidified air is discharged. A hollow fiber membrane bundle including a plurality of dense hollow fiber membranes 106 is received in the housing 101.

An inlet 104 is formed at one side of a peripheral portion of the housing 101, for introduction of humid air discharged from a fuel cell stack. An outlet 105 is also formed at an opposite side of the peripheral portion of the housing 101, for discharge of air produced in accordance with removal of moisture from the introduced humid air.

The present disclosure is characterized in that structures 110 for buffering and spacing of hollow fiber membranes are each interposed between adjacent ones of the plurality of hollow fiber membranes 106 arranged in the housing 101.

In accordance with the embodiment of the present disclosure illustrated in FIG. 3, straight structures 110 for buffering and spacing of hollow fiber membranes, which have a greater diameter than each hollow fiber membrane 106 while having the same length as each hollow fiber membrane 106, are each interposed between the adjacent hollow fiber membrane 106.

Alternatively, in accordance with the embodiment of the present disclosure illustrated in FIG. 4, crimp-shaped structures 110 for buffering and spacing of hollow fiber membranes, which have a greater vertical width than the diameter of each hollow fiber membrane 106 while having the same length as each hollow fiber membrane 106, are each interposed between the adjacent hollow fiber membranes 106.

Figure 6A:
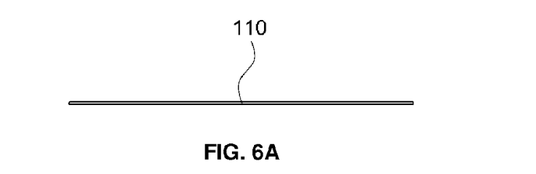
FIG. 6a through FIG. 6e are views illustrating embodiments of a structure for buffering and spacing of hollow fiber membranes in the membrane humidifier according to the present disclosure.
Figure 6B:
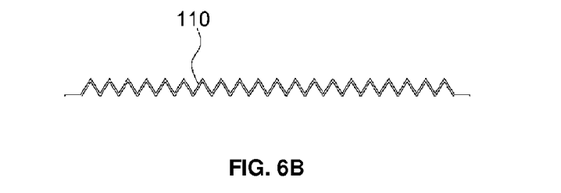
Figure 6C:
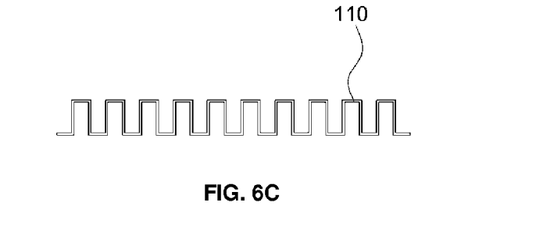
Figure 6D:
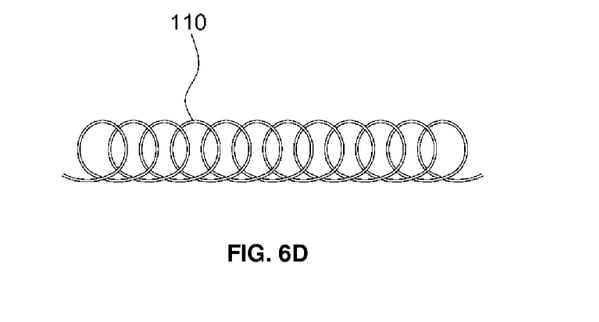
Figure 6E:
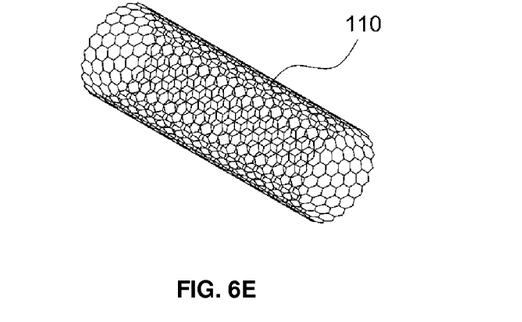

Otherwise, as illustrated in FIG. 6, the buffering and spacing structures 110 each interposed between the adjacent hollow fiber membranes 106 may have a shape selected from a zig-zag shape (FIG. 6(b)), a protrusion/groove shape (FIG. 6(c)), a coil spring shape (FIG. 6(d)), and a cylindrical mesh roll shape (FIG. 6(e)), other than a straight shape (FIG. 6(a)).

The buffering and spacing structures 110, which may have various shapes, as described above, are each interposed between adjacent ones of the bundled hollow fiber membranes 106 and, as such, not only functions to buffer and support the adjacent hollow fiber membranes 106 in order to prevent the adjacent hollow fiber membranes 106 from being bent or broken by the pressure of air supplied from the air blower, but also functions to maintain desired spacing between the adjacent hollow fiber membranes 106 in order to form a flow channel for humid air.

Figure 5:
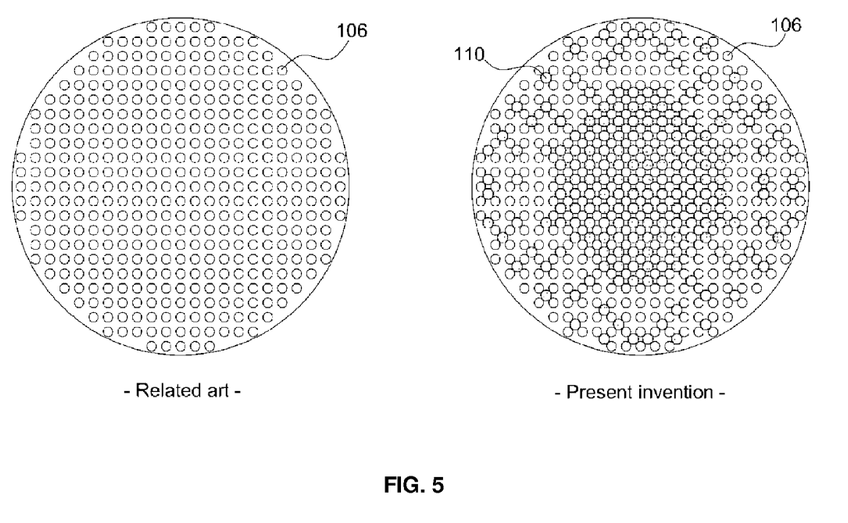
FIG. 5 is a vertical sectional view briefly illustrating a membrane humidifier for a fuel cell according to the present disclosure.

Preferably, as illustrated in FIG. 5, the buffering and spacing structures 110 are arranged such that a largest number of buffering and spacing structures 110 is densely arranged at a central portion of the hollow fiber membrane bundle, and a gradually reduced number of buffering and spacing structures 110 is arranged toward a peripheral portion of the hollow fiber membrane bundle. This is because humid air exhausted from the fuel cell stack after reaction cannot smoothly penetrate the central portion of the hollow fiber membrane bundle after being supplied to the peripheral portion of the hollow fiber membrane bundle.

In accordance with such an arrangement of the buffering and spacing structures 110, the hollow fiber membranes 106 arranged at the central portion of the hollow fiber membrane bundle are spaced apart from one another by a predetermined distance, for formation of flow channels for humid air. Accordingly, humid air exhausted from the fuel cell stack after reaction can smoothly penetrate the central portion of the hollow fiber membrane bundle after being supplied to the peripheral portion of the hollow fiber membrane bundle.

Meanwhile, when the buffering and spacing structures 110 are made of a hydrophilic material (for example, the same material as the hollow fiber membranes), moisture of humid air may be more easily transferred to the hollow fiber membranes 106 adjacent to each structure 110 simultaneously with formation of dewdrops on the structure 110. Accordingly, humidification effects of the hollow fiber membranes for dry air may be further enhanced.

When the above-described buffering and spacing structures 110 are each interposed between the adjacent hollow fiber membranes 106, there may be a limitation in securing a larger flow channel for humid air, namely, a larger space between the adjacent hollow fiber membranes 106 because a surface contact area is present between each structure 110 and each hollow fiber membrane 106 arranged adjacent to the structure 110.

Taking such a limitation into consideration, humid air guide holes or grooves 112 are additionally formed at each structure 110 in a radial direction of the structure 110 and, as such, it may be possible to reduce the surface contact area between the structure 110 and each of the corresponding hollow fiber membranes 106. Accordingly, when humid air is guided to the space between the adjacent hollow fiber membranes 106, the area of the humid air contacting the hollow fiber membranes is increased and, as such, humidification effects of the hollow fiber membranes for dry air may be further enhanced.

Meanwhile, fixing the buffering and spacing structures 110 between the hollow fiber membranes 106 may be achieved by potting the structures 110, using a potting material, together with the hollow fiber membranes 106, upon potting the hollow fiber membranes 106.

Figure 7:
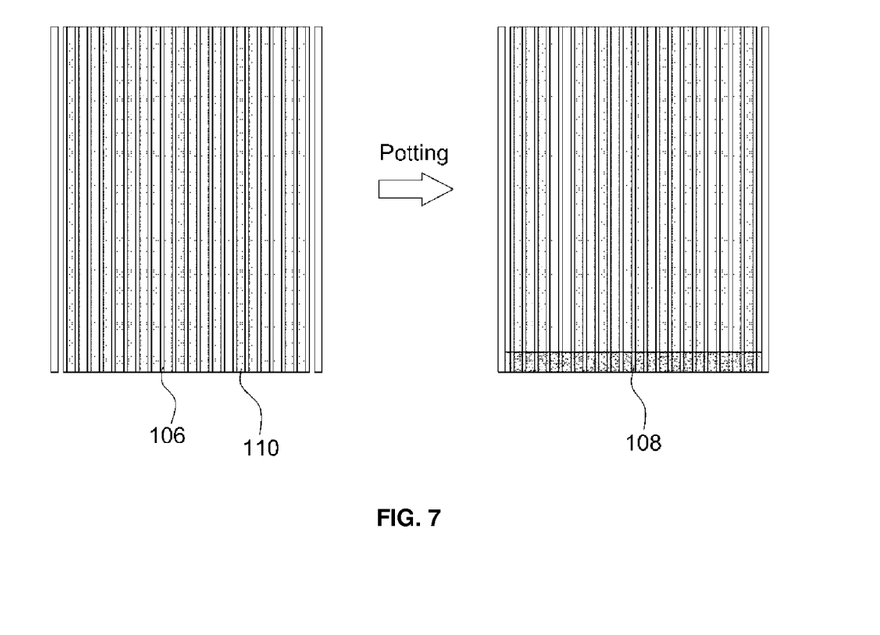
FIG. 7 is a view illustrating a potting method for the membrane humidifier according to the present disclosure.

That is, as illustrated in FIG. 7, the buffering and spacing structures 110 are each arranged at a desired position between adjacent ones of the bundled hollow fiber membranes 106, and opposite ends of each structure 110 and opposite ends of each hollow fiber membrane 106 are then potted by a potting material 108, namely, a polymer molding resin, in a potting device using centrifugal force. Thus, the hollow fiber membranes 106 and the structures 110 are easily fixed in a state in which each structure 110 is interposed between the adjacent hollow fiber membranes 106.

Hereinafter, humidification operation of the membrane humidifier according to the present disclosure will be described.

As hydrogen is supplied to the anode of the fuel cell stack, and, at the same time, oxygen is supplied from the air supply system to the cathode of the fuel cell stack, oxidation of hydrogen occurs at the anode and, as such, hydrogen ions (protons) and electrons are generated. The generated protons and electrons move to the cathode through an electrolytic membrane and a separation plate. At the cathode, an electrochemical reaction is generated by the protons and electrons that moved from the anode and the supplied oxygen and, as such, water is produced and, at the same time, electric energy is generated by flow of electrons.

Exhaust gas is discharged from the stack after the above-described reaction in the fule cell stack. The exhaust gas is humid air.

Accordingly, when exhaust gas discharged from the fuel cell stack after a reaction, namely, humid air, is first supplied from the inlet 104 of the housing 101 to the hollow fiber membranes 106 at the peripheral portion of the hollow fiber membrane bundle, the humid air may smoothly penetrate not only the peripheral side hollow fiber membranes 106, but also the hollow fiber membranes 106 at the central portion of the hollow fiber membrane bundle, because the hollow fiber membranes 106 at the central portion of the hollow fiber membrane bundle are uniformly spaced apart from one another by a predetemined distance by the buffering and spacing structures 110, for formation of flow channels for humid air.

Meanwhile, the buffering and spacing structures 110 are made of a hydrophilic material (for example, the same material as the hollow fiber membranes) and, as such, moisture of humid air may be more easily transferred to the hollow fiber membranes 106 adjacent to each structure 110 simultaneously with formation of dewdrops on the structure 110.

In addition, humid air may more easily penetrate each hollow fiber membrane 106 through the humid air guide holes or grooves 112 formed at each structure 110 in a radial direction of the structure 110.

Moisture of the humid air penetrating as described above is separated from the humid air in accordance with capillary action of each hollow fiber membrane 106. The separated moisture is condensed while permeating capillary tubes of the hollow fiber membranes 106 and, as such, moves through the inside of the hollow fiber membranes 106.

At the same time, ambient air (dry air) is supplied through the supply port 102 of the housing 101 in accordance with the driving of the air blower 202. The dry air supplied through the supply port 102 moves through the inside of the hollow fiber membranes 106. At this time, moisture separated from the humid air has already been moved to the inside of the hollow fiber membranes 106 and, as such, the dry air is humidified by the moisture. The humidified air is supplied to the cathode of the fuel cell stack through the discharge port 103.

Meanwhile, air produced in accordance with separation of moisture from the humid air moves along the outsides of the hollow fiber membranes 106, to be directly exhausted to the outside through the outlet 105 of the housing 101.

Thus, humid air may more easily penetrate between the adjacent hollow membranes 106 in that it may be possible to easily secure a space between the hollow fiber membranes 106 (in particular, between the central side hollow fiber membranes 106), namely, a flow channel for humid air, by the buffering and spacing structures 110, the structures 110 are made of a hydrophilic material, and the humid air guide holes or grooves 112 are formed at each structure 110 in a radial direction of the structure 110. As a result, the humidification efficiency of the membrane humidifier may be more enhanced, as compared to conventional embodiments.

Meanwhile, in a variable pressure system in which the pressure of air introduced into a humidifier from the air blower 202 is high, there may be a leaning phenomenon in which hollow fiber membranes arranged in a membrane humidifier are inclined toward one side or a risk of breakage of hollow fiber membranes may occur. In accordance with the present disclosure, however, even when high pressure of air is applied to the hollow fiber membranes 106, it may be possible to prevent a phenomenon in which the hollow fiber membranes 106 are inclined toward one side or broken, because the buffering and spacing structures 110 support and buffer the hollow fiber membranes 106.

As apparent from the above description, the present disclosure provides the following effects.

First, when high pressure of air is applied to the hollow fiber membranes in accordance with use of a variable pressure system in which the pressure of air introduced into the humidifier from an air blower is high, it may be possible to prevent a phenomenon in which the hollow fiber membranes are inclined toward one side or broken, by supporting and buffering functions of the structures for buffering and spacing of hollow fiber membranes each arranged between the adjacent hollow fiber membranes.

Second, since the hollow fiber membranes are spaced apart from one another by a predetermined distance by the structures for buffering and spacing of hollow fiber membranes, it may be possible to smoothly supply humid air between the adjacent hollow fiber membranes, and to uniformly distribute dry air into the inside of the hollow fiber membranes. Accordingly, an enhancement in humidification performance may be achieved.

Third, since the structures for buffering and spacing of hollow fiber membranes are potted together with the hollow fiber membranes, upon potting opposite ends of the hollow fiber membranes using a potting material, it may be possible to prevent a phenomenon in which the hollow fiber membranes are twisted during a potting process, by supporting and buffering functions of the structures.

Fourth, humid air may more smoothly flow between the adjacent hollow fiber membranes because the structures for buffering and spacing of hollow fiber membranes are made of a hydrophilic material, and humid air guide holes or grooves are formed at each structure in a radial direction of the structure. Accordingly, humidification performance may be further enhanced.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A membrane humidifier comprising:
buffering and spacing structures each interposed between adjacent hollow fiber membranes of a plurality of hollow fiber membranes arranged in a housing of the membrane humidifier,
wherein the buffering and spacing structures are arranged such that a largest number of buffering and spacing structures is arranged at a central side, and a gradually reduced number of buffering and spacing structures is arranged toward a peripheral side, and
wherein the buffering and spacing structures buffer a pressure of air supplied from an air blower and maintain a spacing to form a flow channel for humid air between the adjacent hollow fiber membranes.

2. The membrane humidifier of claim 1, wherein the buffering and spacing structures comprise a hydrophilic material.

3. The membrane humidifier of claim 1, wherein the buffering and spacing structures have a greater diameter than the hollow fiber membranes, and have a length equal to a length of the hollow fiber membranes.

4. The membrane humidifier of claim 1, wherein the buffering and spacing structures have a shape selected from the group comprising a straight shape, a zig-zag shape, a protrusion/groove shape, a coil spring shape, a crimp shape, and a mesh roll shape.

5. The membrane humidifier of claim 1, wherein opposite ends of the buffering and spacing structures are potted together with opposite ends of the hollow fiber membranes, using a potting material.

6. The membrane humidifier of claim 1, wherein humid air guide holes are formed at each of the buffering and spacing structures in a radial direction of the buffering and spacing structure.

7. The membrane humidifier of claim 1, wherein humid air grooves are formed at each of the buffering and spacing structures in a radial direction of the buffering and spacing structure.

* * * * *